United States Patent
Itokazu et al.

(10) Patent No.: US 9,089,916 B2
(45) Date of Patent: Jul. 28, 2015

(54) WIRE ELECTRIC DISCHARGE MACHINING APPARATUS, WIRE ELECTRIC DISCHARGE MACHINING METHOD, THIN PLATE MANUFACTURING METHOD, AND SEMICONDUCTOR WAFER MANUFACTURING METHOD

(75) Inventors: Atsushi Itokazu, Tokyo (JP); Hidetaka Miyake, Tokyo (JP); Tatsushi Sato, Tokyo (JP); Takashi Yuzawa, Tokyo (JP); Kazuhiko Fukushima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 276 days.

(21) Appl. No.: 13/817,092

(22) PCT Filed: Jun. 14, 2011

(86) PCT No.: PCT/JP2011/063578
§ 371 (c)(1),
(2), (4) Date: Feb. 14, 2013

(87) PCT Pub. No.: WO2012/042980
PCT Pub. Date: Apr. 5, 2012

(65) Prior Publication Data
US 2013/0140277 A1 Jun. 6, 2013

(30) Foreign Application Priority Data
Oct. 1, 2010 (JP) ................. 2010-224345

(51) Int. Cl.
*B23H 1/10* (2006.01)
*B23H 7/10* (2006.01)
(Continued)

(52) U.S. Cl.
CPC ................. *B23H 1/10* (2013.01); *B23H 1/028* (2013.01); *B23H 7/105* (2013.01); *B23H 7/107* (2013.01); *B23H 9/00* (2013.01)

(58) Field of Classification Search
CPC ........ B23H 1/028; B23H 7/105; B23H 7/107; B23H 9/00; B23H 1/10
See application file for complete search history.

(56) References Cited

U.S. PATENT DOCUMENTS

| 5,089,680 A * | 2/1992 | Truty .......................... 219/69.12 |
| 2010/0187203 A1* | 7/2010 | Bamberg et al. ........... 219/69.12 |
| 2012/0312787 A1* | 12/2012 | Nakagawa et al. ........ 219/69.12 |

FOREIGN PATENT DOCUMENTS

| JP | 54 17291 | 2/1979 |
| JP | 54 78096 | 6/1979 |

(Continued)

OTHER PUBLICATIONS

Chinese Office Action issued Aug. 5, 2014, in Chinese Patent Application No. 201180047137.7 (with English translation).

(Continued)

*Primary Examiner* — Geoffrey S Evans
(74) *Attorney, Agent, or Firm* — Oblon, McClelland, Maier & Neustadt, L.L.P.

(57) ABSTRACT

A wire electric discharge machining apparatus includes a wire electrode, a guide roller that arranges wire electrodes in parallel by winding the wire electrode therearound, a plurality of slidable contact conductors that are in slidable contact with the wire electrodes arranged in parallel, respectively, and a power feeding jig that holds the slidable contact conductors individually and feeds power individually to the wire electrodes arranged in parallel via each of the slidable contact conductors, in which the power feeding jig includes a plurality of reference surfaces that determine a fixing interval between the slidable contact conductors.

8 Claims, 7 Drawing Sheets

(51) Int. Cl.
  *B23H 1/02* (2006.01)
  *B23H 9/00* (2006.01)

(56) References Cited

FOREIGN PATENT DOCUMENTS

| JP | 9 248719 | 9/1997 |
| JP | 2000 94221 | 4/2000 |
| JP | 2007-237348 A | * 9/2007 |
| JP | 2009 166211 | 7/2009 |
| JP | 2010 5735 | 1/2010 |
| WO | 2009 154199 | 12/2009 |

OTHER PUBLICATIONS

International Search Report Issued Jul. 12, 2011 in PCT/JP11/63578 Filed Jun. 14, 2011.

* cited by examiner

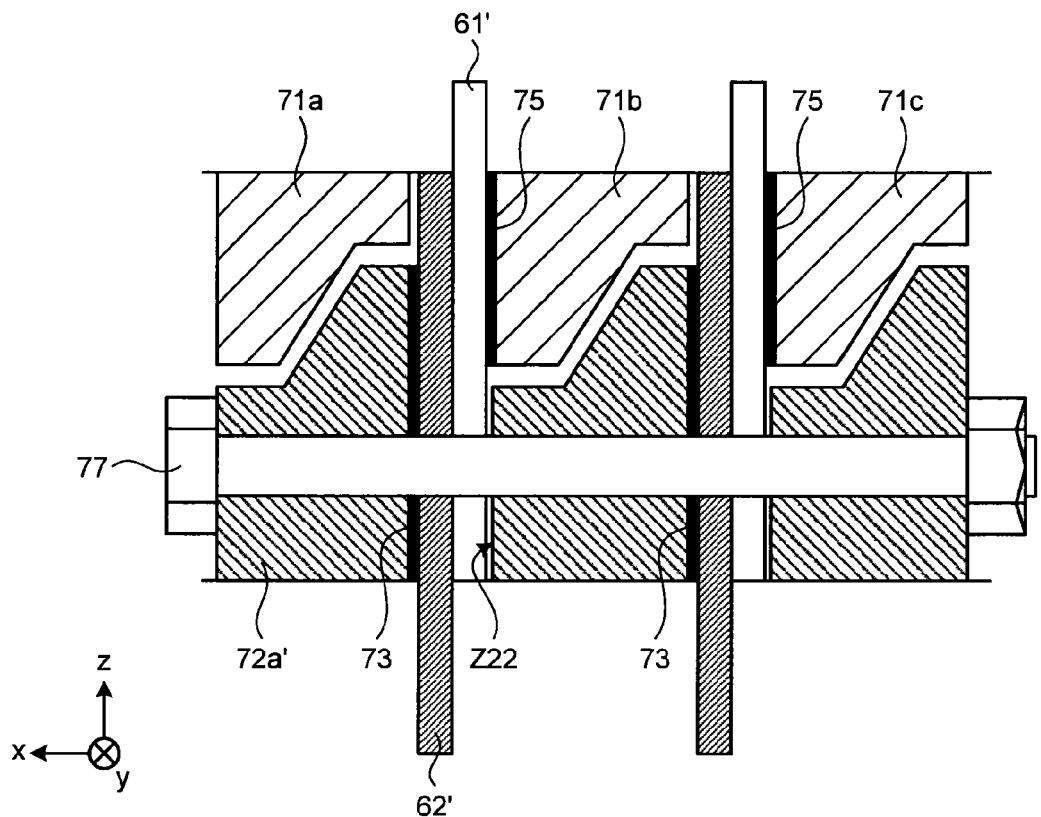
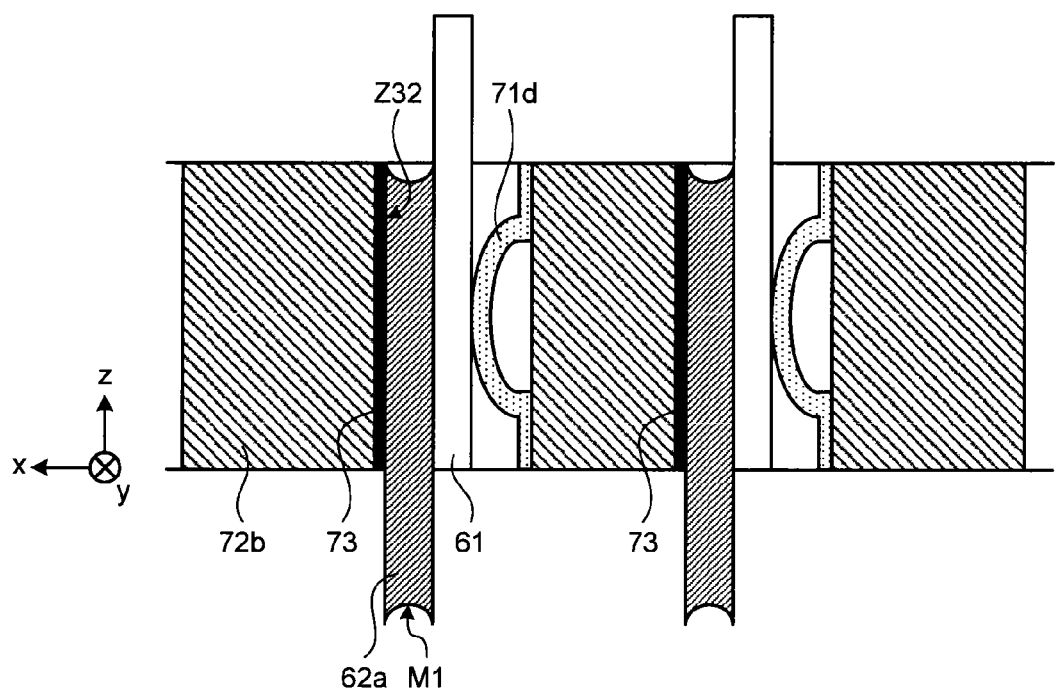

WIRE ELECTRIC DISCHARGE MACHINING APPARATUS, WIRE ELECTRIC DISCHARGE MACHINING METHOD, THIN PLATE MANUFACTURING METHOD, AND SEMICONDUCTOR WAFER MANUFACTURING METHOD

FIELD

The present invention relates to a wire electric discharge machining apparatus, a wire electric discharge machining method, a thin plate manufacturing method, and a semiconductor wafer manufacturing method, particularly to a wire electric discharge machining apparatus, a wire electric discharge machining method, a thin plate manufacturing method, and a semiconductor wafer manufacturing method, capable of collectively cutting out a plurality of thin plates from a workpiece by arranging wire electrodes in parallel by winding one wire between a plurality of guide rollers and generating a discharge between the wire electrodes arranged in parallel and the workpiece.

BACKGROUND

There is a method of collectively cutting out a plurality of thin plates from a workpiece by arranging wire electrodes in parallel by winding one wire electrode between a plurality of guide rollers and applying a voltage and generating a discharge between the wire electrodes and the columnar workpiece.

Moreover, Patent Literature 1 discloses a technology in which a structure, in which an insulator and a slidable contact conductor that is in slidable contact with a wire are alternately laminated, is provided in a power feeding unit for the cutting wires, and the amount of machining per unit time is made substantially equal in each cutting wire by maintaining a high discharge voltage between a cutting wire unit and a workpiece by feeding power individually between the workpiece and the cutting wires via a conductor electrically connected to the power source and the slidable contact conductors.

CITATION LIST

Patent Literature

Patent Literature 1: Japanese Patent Application Laid-open 2000-94221

SUMMARY

Technical Problem

However, according to the above-described conventional technology, because an integral structure, in which the insulator and the slidable contact conductor are alternately laminated, is used, if there is a dimension error in the insulator and the slidable contact conductor, a cumulative error occurs at the position of each slidable contact conductor with respect to the fixing reference surface of the power feeding unit and thus power feeding to the cutting wire unit cannot be maintained satisfactorily. Therefore, there is a problem in that in order to maintain power feeding to the cutting wire unit satisfactorily, it is necessary to perform fine adjustment of the intervals between the slidable contact conductors when the power feeding unit is assembled.

Moreover, in the maintenance of the power feeding unit, the slidable contact conductors are consumable; therefore, fine adjustment of the intervals between the slidable contact conductors needs to be performed every time the maintenance is performed, and moreover, if the number of the cutting wires is increased, the number of the slidable contact conductors is also increased; therefore, there is a problem in that a great deal of labor is required for disassembling and assembling.

The present invention is achieved in view of the above and has an object to obtain a wire electric discharge machining apparatus, a wire electric discharge machining method, a thin plate manufacturing method, and a semiconductor wafer manufacturing method, capable of positioning each slidable contact conductor while preventing a cumulative error from occurring at the position of each slidable contact conductor even when there is a dimension error in the slidable contact conductor.

Solution to Problem

In order to solve the above problem and in order to attain the above object, a wire electric discharge machining apparatus of the present invention includes: a wire electrode; a guide roller that arranges wire electrodes in parallel by winding the wire electrode therearound; a plurality of slidable contact conductors that are in slidable contact with the wire electrodes arranged in parallel, respectively; and a power feeding jig that holds the slidable contact conductors individually and feeds power individually to the wire electrodes arranged in parallel via each of the slidable contact conductors. Additionally, the power feeding jig includes a plurality of reference surfaces that determine a fixing interval between the slidable contact conductors.

Advantageous Effects of Invention

According to the present invention, an effect is obtained where even when there is a dimension error in the slidable contact conductor, each slidable contact conductor can be positioned while preventing a cumulative error from occurring at the position of each slidable contact conductor.

BRIEF DESCRIPTION OF DRAWINGS

FIG. 7 is a cross-sectional view illustrating a schematic configuration of a sixth embodiment of a power feeding jig applied to the wire electric discharge machining apparatus according to the present invention.

FIG. 8 is a cross-sectional view illustrating a schematic configuration of a seventh embodiment of a power feeding jig applied to the wire electric discharge machining apparatus according to the present invention.

FIG. 9-1 is a perspective view illustrating a configuration of a power feeding unit of an eighth embodiment of power feeding jigs applied to the wire electric discharge machining apparatus according to the present invention.

FIG. 9-2 is a perspective view illustrating a configuration of the power feeding unit of the eighth embodiment of the power feeding jigs applied to the wire electric discharge machining apparatus according to the present invention.

DESCRIPTION OF EMBODIMENTS

Embodiments of a wire electric discharge machining apparatus according to the present invention will be described below in detail with reference to the drawings. This invention is not limited to the embodiments.

First Embodiment

Figure 1:
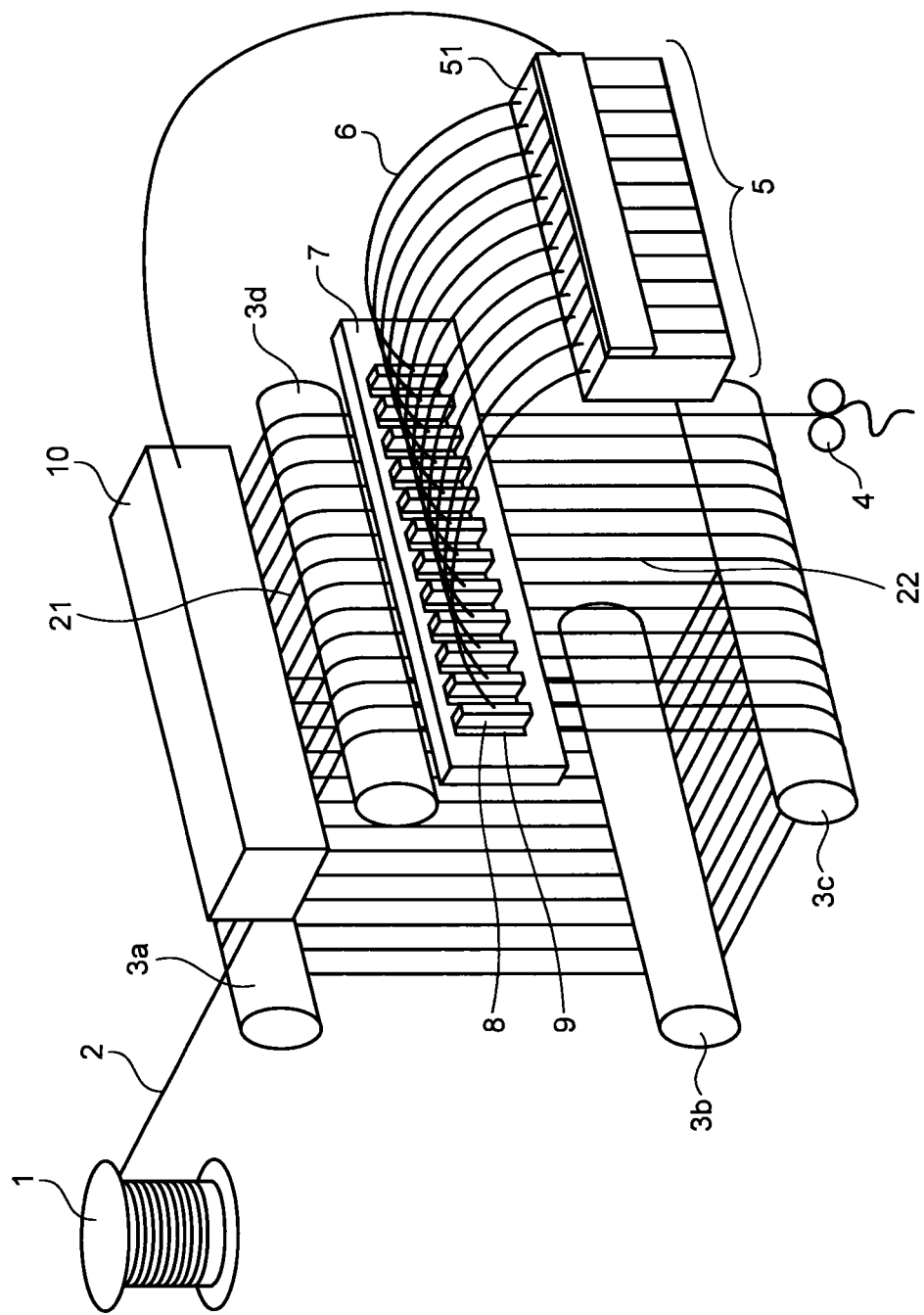
FIG. 1 is a perspective view illustrating a schematic configuration of a first embodiment of a wire electric discharge machining apparatus according to the present invention.

FIG. 1 is a perspective view illustrating a schematic configuration of the first embodiment of a wire electric discharge machining apparatus according to the present invention. In FIG. 1, this wire electric discharge machining apparatus includes guide rollers 3a to 3d that arrange wire electrodes 2 in parallel by winding the wire electrode 2 therearound, a machining power supply unit 5 that supplies a voltage to be applied between the wire electrode 2 and a workpiece 10, and a power feeding jig 7 that feeds the voltage supplied from the machining power supply unit 5 to the wire electrode 2.

The guide rollers 3a to 3d are arranged such that they are spaced apart and are in parallel with each other in the axis direction and the wire electrode 2 is wound a plurality of times around the guide rollers 3a to 3d. The wire electrode 2 paid out from a wire bobbin 1 is wound a plurality of times around the guide rollers 3a to 3d in the sequence they appear in the sentence and is collected by a wire collecting roller 4.

Then, the wire electrodes 2 that extend in parallel between the guide rollers 3a and 3d form a plurality of cutting wire portions 21 that cut the workpiece 10. Moreover, the wire electrodes 2 that extend in parallel between the guide rollers 3c and 3d form a plurality of power feeding wire portions 22 that individually feed power to each cutting wire portion 21.

The power feeding jig 7 includes power feeding terminals 8 that receive the voltage supplied from the machining power supply unit 5 for each power feeding wire portion 22 and slidable contact conductors 9 that come into slidable contact with the cutting wire portions 21, respectively. Then, the power feeding terminal 8 and the slidable contact conductor 9 are individually held by the power feeding jig 7 for each cutting wire portion 21 such that they are in contact with each other.

The machining power supply unit 5 includes a plurality of machining power sources 51. The machining power sources 51 are connected to the power feeding terminals 8 via feeder wires 6 and one machining power source 51 is connected to one or a plurality of the power feeding wire portions 22 via the feeder wire 6, the power feeding terminal 8, and the slidable contact conductor 9 in the sequence they appear in the sentence.

The machining power supply unit 5 can generate a discharge by applying a voltage between the workpiece 10 and the cutting wire portions 21 spaced apart from the workpiece 10 by a minute distance. The polarity of the voltage applied by the machining power sources 51 can be appropriately reversed as necessary.

Moreover, the workpiece 10 can be sent in the cutting direction while being controlled to keep an appropriate separation distance with respect to the cutting wire portions 21 by a position control device. A machining fluid can be supplied to a portion between the workpiece 10 and the cutting wire portions 21 by spraying or immersing.

An ingot shaped object to be sliced into a plurality of thin plates can be used as the workpiece 10. Moreover, examples of the material of the workpiece 10 include metal, such as tungsten and molybdenum, to be a sputtering target, ceramic, such as polycrystalline silicon carbide, to be used as various structural members, a semiconductor material, such as single-crystal silicon and single-crystal silicon carbide, to be a semiconductor device wafer, a solar cell material, such as single-crystal and polycrystalline silicon, to be a solar cell wafer, and the like.

Among the above materials, metal has a sufficiently low specific resistance; therefore, electric discharge machining can be performed on metal with no problem and, among semiconductor materials and solar cell materials, a material, on which electric discharge machining can be performed, has a specific resistance of about 100 Ωcm or less, desirably, 10 Ωcm or less.

Therefore, as the workpiece 10, metal or a material, which has a specific resistance substantially equal to that of metal or in the range of 100 Ω·cm or less, desirably, 10 Ωcm or less, can be used. Specially, a semiconductor material and a solar cell material that have a specific resistance in the above range are preferable.

Even if there is a dimension error in the slidable contact conductor 9, a cumulative error can be prevented from occurring at the position of each slidable contact conductor 9 by individually holding the slidable contact conductors 9 by the power feeding jig 7 for each cutting wire portion 21.

The example in FIG. 1 illustrates a case where one wire electrode 2 is wound around the four guide rollers 3a to 3d; however, it is not limited to this case, and the method thereof is not specifically limited as long as the cutting wire portions 21 are formed from one wire electrode 2.

Second Embodiment

Figure 2:
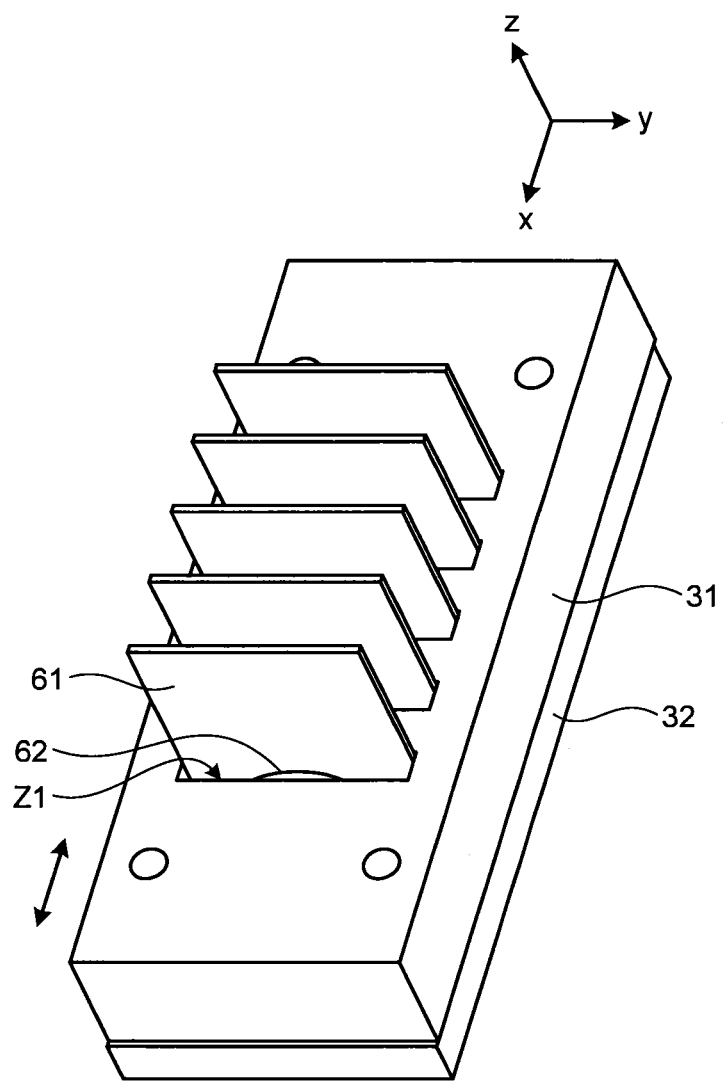
FIG. 2 is a perspective view illustrating a schematic configuration of a second embodiment of a power feeding jig applied to the wire electric discharge machining apparatus in FIG. 1.
Figure 3:
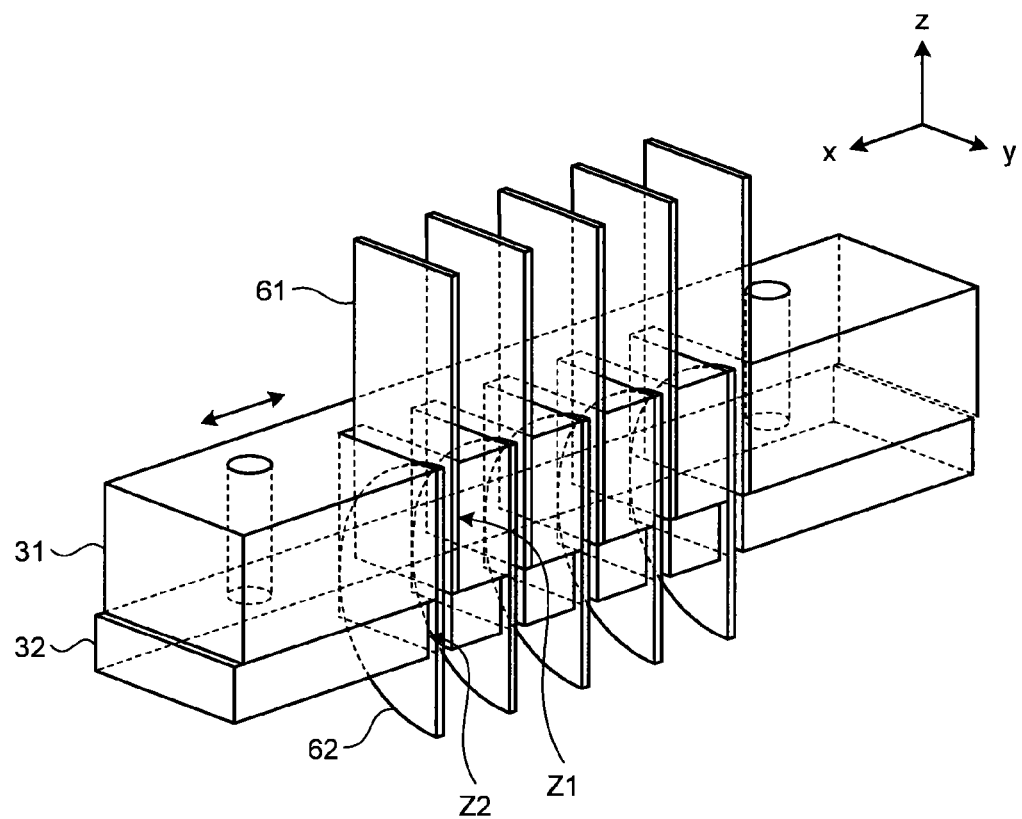
FIG. 3 is a cross-sectional view illustrating a configuration of the power feeding jig in FIG. 2 cut along the x direction.

FIG. 2 is a perspective view illustrating a schematic configuration of the second embodiment of a power feeding jig applied to the wire electric discharge machining apparatus in FIG. 1 and FIG. 3 is a cross-sectional view illustrating a configuration of the power feeding jig in FIG. 2 cut along the x direction. In FIG. 2 and FIG. 3, the power feeding jig includes a fixing jig 32, on which a plurality of reference surfaces that determine the fixing intervals between slidable contact conductors 62 is formed, and a pressing jig 31 that presses the slidable contact conductors 62 against the reference surfaces.

In the pressing jig 31, openings Z1, into which the slidable contact conductors 62 and power feeding terminals 61 are inserted, are formed at predetermined intervals. In the fixing jig 32, openings Z2, into which the slidable contact conductors 62 and the power feeding terminals 61 are inserted, are formed at predetermined intervals.

The slidable contact conductor 62 and the power feeding terminal 61 can be inserted into the openings Z1 and Z2 in a state where the slidable contact conductor 62 and the power feeding terminal 61 are in contact with each other. When the slidable contact conductor 62 and the power feeding terminal 61 are inserted into the openings Z1 and Z2, the power feeding terminal 61 can be projected to the machining power supply unit 5 side in FIG. 1. When the slidable contact conductor 62 and the power feeding terminal 61 are inserted into the openings Z1 and Z2, the slidable contact conductor 62 can be projected to the wire electrode 2 side in FIG. 1.

Moreover, the pressing jig 31 can be slid in the aligned direction (x direction) of the openings Z1 in a state of being arranged on the fixing jig 32. Moreover, the size of each of the openings Z1 and Z2 can be set such that when the slidable contact conductor 62 and the power feeding terminal 61 are inserted thereinto, a clearance can be formed in the aligned direction (x direction) of the openings Z1.

Then, in a state where the slidable contact conductors 62 and the power feeding terminals 61 are inserted into the openings Z1 and Z2, the pressing jig 31 is slid, thereby enabling the slidable contact conductors 62 and the power feeding terminals 61 to be collectively pressed against the reference surfaces.

Consequently, even when there is a dimension error in the slidable contact conductor 62, each slidable contact conductor 62 can be positioned while preventing a cumulative error from occurring at the position of each slidable contact conductor 62. Therefore, power feeding to the cutting wire portions 21 can be maintained satisfactory without performing fine adjustment of the intervals between the slidable contact conductors 62.

In order to enable a high voltage to be applied to the cutting wire portions 21, the pressing jig 31 and the fixing jig 32 may be made of an insulating material, such as ceramic and resin, or made of a composite material obtained by coating the surface of a conductive material with an insulating material, such as aluminum on the surface of which an anodic oxidation coating is formed or stainless steel to the surface of which enamel is applied.

Moreover, a conductor can be used for the slidable contact conductors 62 and the power feeding terminals 61. Specifically, in order to suppress consumption due to wire running, a hard conductor, such as cemented carbide, may be used for the slidable contact conductors 62.

Third Embodiment

Figure 4:
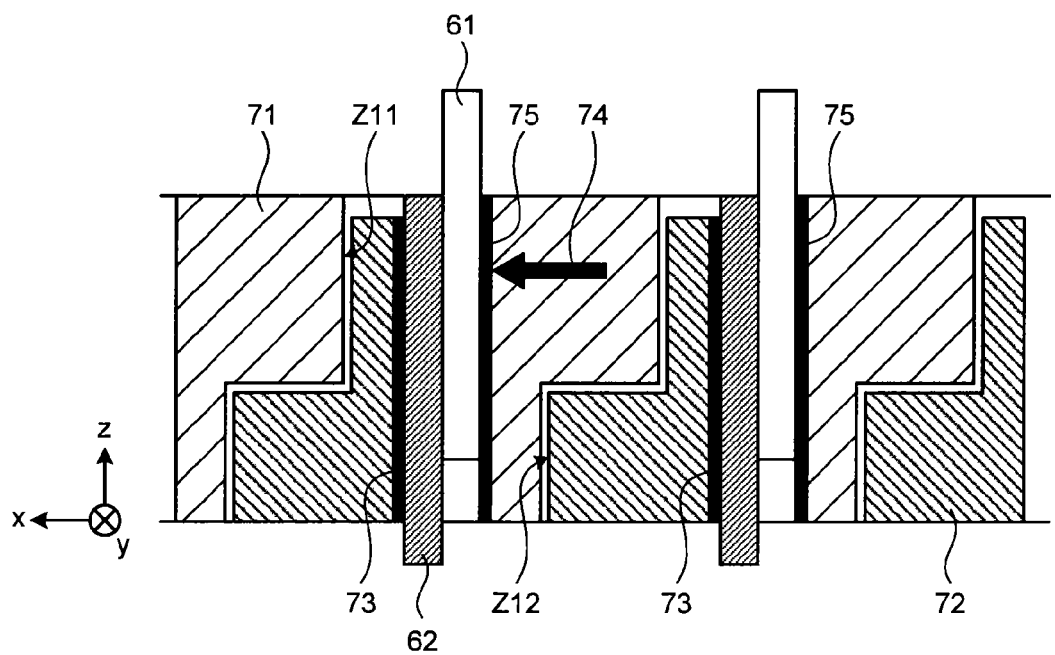
FIG. 4 is a cross-sectional view illustrating a schematic configuration of a third embodiment of a power feeding jig applied to the wire electric discharge machining apparatus according to the present invention.

FIG. 4 is a cross-sectional view illustrating a schematic configuration of the third embodiment of a power feeding jig applied to the wire electric discharge machining apparatus according to the present invention. In FIG. 4, the power feeding jig includes a fixing jig 72 that performs positioning of the slidable contact conductors 62 and a pressing jig 71 that presses the slidable contact conductors 62 against the fixing jig 72.

Reference surfaces 73 for positioning the slidable contact conductors 62 are formed on the fixing jig 72 and pressing surfaces 75 that press the slidable contact conductors 62 are formed on the pressing jig 71. Moreover, openings Z11, into which the slidable contact conductors 62 and the power feeding terminals 61 are inserted, are formed at predetermined intervals in the pressing jig 71. Openings Z12, into which the slidable contact conductor 62 and the power feeding terminal 61 are inserted, are formed at predetermined intervals in the fixing jig 72. The reference surface 73 is arranged on the side surface of each opening Z12. The pressing surface 75 is arranged on the side surface of each opening Z11.

Moreover, steps for inserting a part of the pressing jig 71 into the openings Z12 are formed on the pressing jig 71. Steps for inserting a part of the fixing jig 72 into the openings Z11 are formed on the fixing jig 72.

The slidable contact conductor 62 and the power feeding terminal 61 can be inserted into the openings Z11 and Z12 in a state where the slidable contact conductor 62 and the power feeding terminal 61 are in contact with each other. When the slidable contact conductor 62 and the power feeding terminal 61 are inserted into the openings Z11 and Z12, the power feeding terminal 61 can be projected to the machining power supply unit 5 side in FIG. 1. When the slidable contact conductor 62 and the power feeding terminal 61 are inserted into the openings Z11 and Z12, the slidable contact conductor 62 can be projected to the wire electrode 2 side in FIG. 1.

Moreover, the pressing jig 71 can be slid in the aligned direction (x direction) of the openings Z11 in a state of being arranged on the fixing jig 72. Moreover, the size of each of the openings Z11 and Z12 can be set such that when the slidable contact conductor 62 and the power feeding terminal 61 are inserted thereinto, a clearance can be formed in the aligned direction (x direction) of the openings Z11.

Then, in a state where the slidable contact conductors 62 and the power feeding terminals 61 are inserted into the openings Z11 and Z12, the pressing jig 71 is slid in a pressing direction 74 (x direction), thereby enabling the slidable contact conductors 62 and the power feeding terminals 61 to be collectively pressed against the reference surfaces 73 of the fixing jig 72.

Consequently, the slidable contact conductor 62 can be fixed to each reference surface 73. Therefore, even when there is a dimension error in the slidable contact conductor 62, the intervals between the slidable contact conductors 62 can be uniquely determined. Moreover, the intervals between the reference surfaces 73 can be easily controlled by integrally forming the reference surfaces 73, which determine the fixing intervals between the slidable contact conductors 62, on the fixing jig 72.

Moreover, the pressing surfaces 75 can be enlarged by forming the steps for inserting a part of the pressing jig 71 into the openings Z12 on the pressing jig 71, and the reference surfaces 73 can be enlarged by forming the steps for inserting a part of the fixing jig 72 into the openings Z11 on the fixing jig 72. Therefore, the slidable contact conductor 62 and the power feeding terminal 61 can be stably fixed to the reference surfaces 73.

A hard conductor, such as cemented carbide, may be used for the slidable contact conductors 62 for suppressing consumption due to wire running. Moreover, for the pressing jig 71 and the fixing jig 72, an insulator, such as ceramic and plastic, or a part obtained by applying an insulator, such as an anodic oxidation coating, to the surface of a conductor, may be used. Consequently, the slidable contact conductors 62 can be prevented from electrically communicating with each other via the pressing jig 71 and the fixing jig 72; therefore, a high voltage can be applied to the cutting wire portions 21.

Fourth Embodiment

Figure 5:
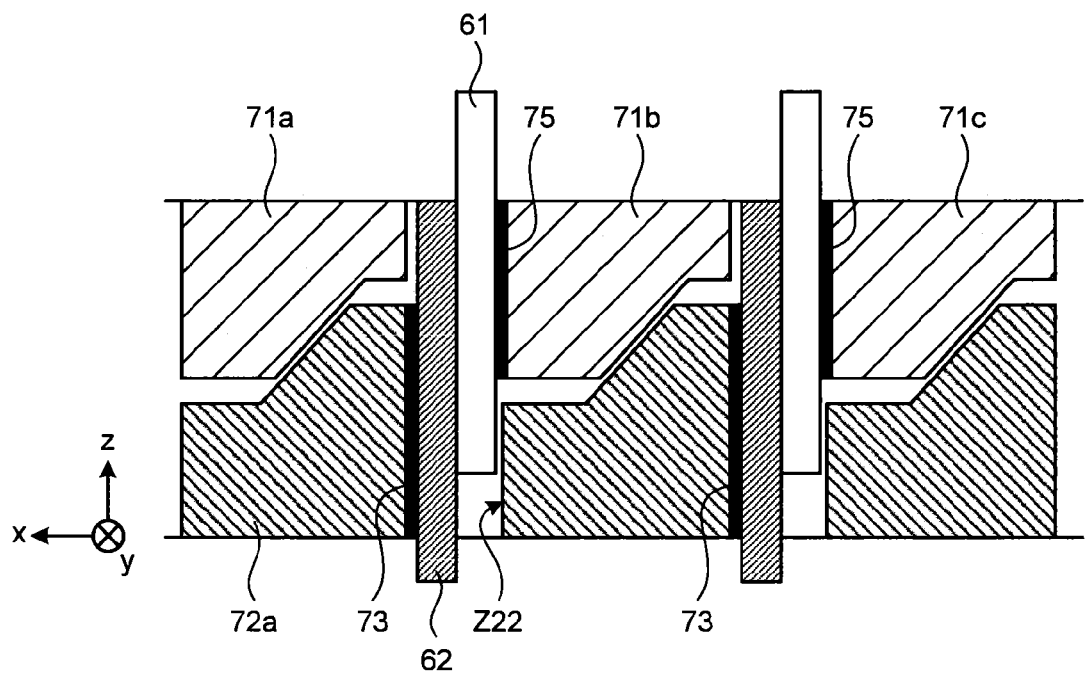
FIG. 5 is a cross-sectional view illustrating a schematic configuration of a fourth embodiment of a power feeding jig applied to the wire electric discharge machining apparatus according to the present invention.

FIG. 5 is a cross-sectional view illustrating a schematic configuration of the fourth embodiment of a power feeding jig applied to the wire electric discharge machining apparatus according to the present invention. FIG. 5, the power feeding jig includes a fixing jig 72a that performs positioning of the slidable contact conductors 62 and pressing jigs 71a to 71c that press the slidable contact conductors 62 against the fixing jig 72a.

The reference surfaces 73 for positioning the slidable contact conductors 62 are formed on the fixing jig 72a and the pressing surface 75 that presses the slidable contact conductor 62 is formed on each of the pressing jigs 71a to 71c. The pressing jigs 71a to 71c may be separately formed or integrally formed.

Moreover, openings Z22, into which the slidable contact conductors 62 and the power feeding terminals 61 are inserted, are formed at predetermined intervals in the fixing jig 72a. The pressing jigs 71a to 71c are each formed in a wedge shape. Moreover, the fixing jig 72a is formed in a wedge shape for each reference surface 73.

In a state where the slidable contact conductor 62 and the power feeding terminal 61 are in contact with each other, the slidable contact conductor 62 and the power feeding terminal 61 can be inserted into the opening Z22. When the slidable contact conductor 62 and the power feeding terminal 61 are inserted into the opening Z22, the power feeding terminal 61 can be projected to the machining power supply unit 5 side in FIG. 1. When the slidable contact conductor 62 and the power feeding terminal 61 are inserted into the opening Z22, the slidable contact conductor 62 can be projected to the wire electrode 2 side in FIG. 1.

Moreover, the pressing jigs 71a to 71c can be slid in the aligned direction (x direction) of the openings Z22 in a state of being arranged on the fixing jig 72a. Moreover, the size of the opening Z22 can be set such that when the slidable contact conductor 62 and the power feeding terminal 61 are inserted thereinto, a clearance can be formed in the aligned direction (x direction) of the openings Z22.

Then, in a state where the slidable contact conductors 62 and the power feeding terminals 61 are inserted into the openings Z22, the pressing jigs 71a to 71c are inserted into the fixing jig 72a such that the wedges of the pressing jigs 71a to 71c are fitted into the wedges of the fixing jig 72a. Then, the pressing jigs 71a to 71c are slid, thereby enabling the slidable contact conductors 62 and the power feeding terminals 61 to be collectively pressed against the reference surfaces 73 of the fixing jig 72a.

The pressing jigs 71a to 71c are each formed in a wedge shape and the fixing jig 72a is formed in a wedge shape for each reference surface 73; therefore, the strength in the vertical direction with respect to the reference surfaces 73 can be increased and thus the slidable contact conductors 62 can be fixed at narrow intervals.

Fifth Embodiment

Figure 6:
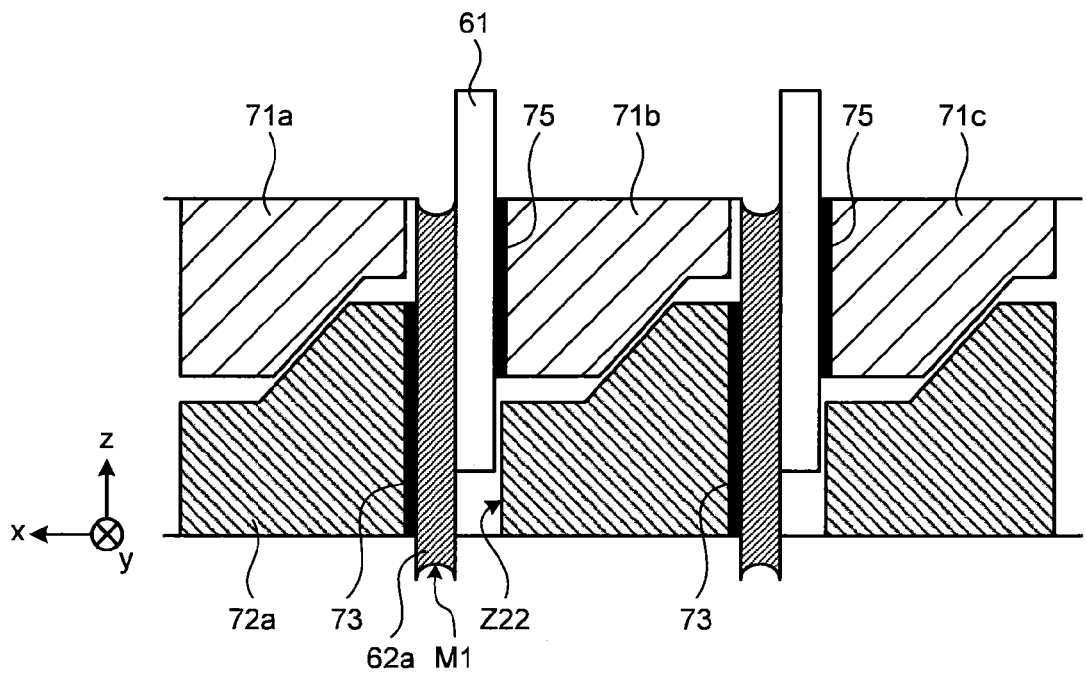
FIG. 6 is a cross-sectional view illustrating a schematic configuration of a fifth embodiment of a power feeding jig applied to the wire electric discharge machining apparatus according to the present invention.

FIG. 6 is a cross-sectional view illustrating a schematic configuration of the fifth embodiment of a power feeding jig applied to the wire electric discharge machining apparatus according to the present invention. In FIG. 6, in this power feeding jig, slidable contact conductors 62a are used instead of the slidable contact conductor 62 in FIG. 5. In the slidable contact conductor 62a, a groove M1, which is wider than the diameter of the wire electrode 2 and is deeper than the radius of the wire electrode 2, is formed on the slidable contact surface that is in slidable contact with the wire electrode 2 in FIG. 1.

The groove M1 is formed on the slidable contact surface of the slidable contact conductor 62a; therefore, a dimension error of each component can be absorbed and power can be fed to the wire electrode 2 satisfactorily.

In the above-described embodiment, the method of using the slidable contact conductors 62a, in each of which the groove M1 is formed on the slidable contact surface, for the power feeing jig in FIG. 5 is described; however, the slidable contact conductors 62a may be used for the power feeding jig in FIG. 3 or FIG. 4.

Sixth Embodiment

FIG. 7 is a cross-sectional view illustrating a schematic configuration of the sixth embodiment of a power feeding jig applied to the wire electric discharge machining apparatus according to the present invention. In FIG. 7, this power feeding jig includes a fixing jig 72a' instead of the fixing jig 72a in FIG. 5. Moreover, this power feeding jig includes slidable contact conductors 62' and power feeding terminals 61' instead of the slidable contact conductors 62 and the power feeding terminals 61 in FIG. 5.

In the fixing jig 72a', the slidable contact conductors 62', and the power feeding terminals 61', a hole, through which a bar-like member 77 passes, is formed. The cross section of the bar-like member 77 in the axis direction and the hole in the slidable contact conductor 62' can be formed into a shape such that the contact surfaces of the slidable contact conductors 62' is indexable.

Then, in a state where the slidable contact conductors 62' and the power feeding terminals 61' are inserted into the openings Z22, the pressing jigs 71a to 71c are inserted into the fixing jig 72a' such that the wedges of the pressing jigs 71a to 71c are fitted into the wedges of the fixing jig 72a'. Then, the pressing jigs 71a to 71c are slid, thereby enabling the slidable contact conductors 62' and the power feeding terminals 61' to be collectively pressed against the reference surfaces 73 of the fixing jig 72a'.

Then, the bar-like member 77 is caused to pass through the holes in the fixing jig 72a', the slidable contact conductors 62', and the power feeding terminals 61', and both ends of the bar-like member 77 can be fixed with a nut or the like such that the slidable contact surfaces of the slidable contact conductors 62' are at the same distance from the bar-like member 77.

Consequently, even when the slidable contact surfaces of the slidable contact conductors 62' wear due to wire running, the slidable contact surfaces of the slidable contact conductors 62' can be changed at the same time by rotating the bar-like member 77.

In the above embodiment, the method of using the bar-like member 77 for the power feeding jig in FIG. 5 is described; however, the bar-like member 77 may be used for the power feeding jig in FIG. 3, FIG. 4, or FIG. 6.

Moreover, in a similar manner to the pressing jig 71 and the fixing jig 72, an insulator, such as ceramic and plastic, or a part obtained by applying an insulator, such as an anodic oxidation coating, to the surface of a conductor, may be used for the bar-like member 77.

Seventh Embodiment

FIG. 8 is a cross-sectional view illustrating a schematic configuration of the seventh embodiment of a power feeding jig applied to the wire electric discharge machining apparatus according to the present invention. In FIG. 8, the power feeding jig includes a fixing jig 72b that performs positioning of the slidable contact conductors 62a and a pressing jig 71d that presses the slidable contact conductors 62a against the fixing jig 72b.

The reference surfaces 73 for positioning the slidable contact conductors 62a are formed on the fixing jig 72b. Moreover, openings Z32, into which the slidable contact conductors 62a and the power feeding terminals 61 are inserted, are formed at predetermined intervals in the fixing jig 72b.

Moreover, the pressing jig 71d is made of a material that is elastic in the aligned direction (x direction) of the openings Z32 and, for example, a compression spring or the like can be used as the pressing jig 71d. Moreover, the pressing jig 71d is configured such that it can be inserted into each opening Z32.

In a state where the slidable contact conductor 62a and the power feeding terminal 61 are in contact with each other, the slidable contact conductor 62a and the power feeding terminal 61 can be inserted into the opening Z32. When the slidable contact conductor 62a and the power feeding terminal 61 are inserted into the opening Z32, the power feeding terminal 61 can be projected to the machining power supply unit 5 side in FIG. 1. When the slidable contact conductor 62a and the power feeding terminal 61 are inserted into the opening Z32, the slidable contact conductor 62a can be projected to the wire electrode 2 side in FIG. 1.

Moreover, the size of the opening Z32 can be set such that when the slidable contact conductor 62a and the power feeding terminal 61 are inserted thereinto, a clearance can be formed in the aligned direction (x direction) of the openings Z32 so that the pressing jig 71d can be inserted.

Then, in a state where the slidable contact conductors 62a and the power feeding terminals 61 are inserted into the openings Z32, the pressing jig 71d is inserted into the openings Z32 in the fixing jig 72b. Then, the slidable contact conductors 62a and the power feeding terminals 61 can be pressed against the reference surfaces 73 of the fixing jig 72b by the elastic force of the pressing jig 71d.

The pressing jig 71d is made of an elastic body; therefore, the slidable contact conductors 62a and the power feeding terminals 61 can be individually fixed to the reference surfaces 73.

Eighth Embodiment

Figures 1, 9:
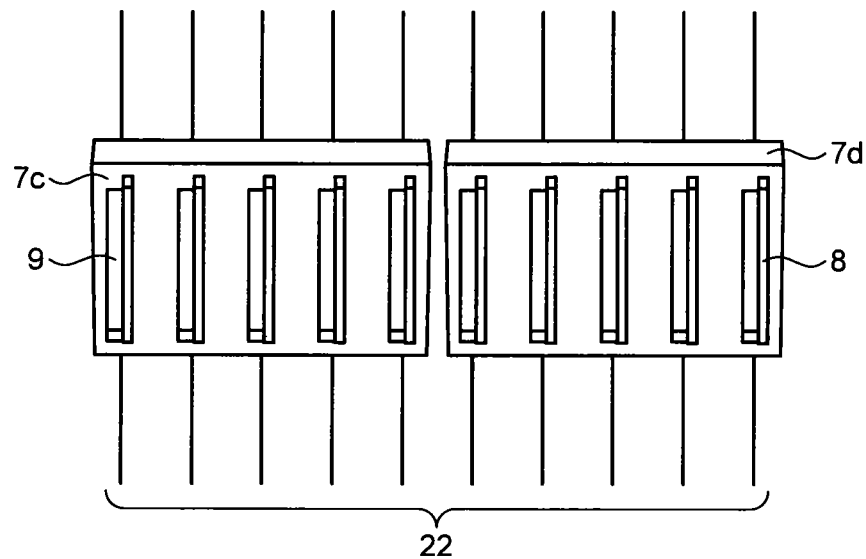
Figures 2, 9:
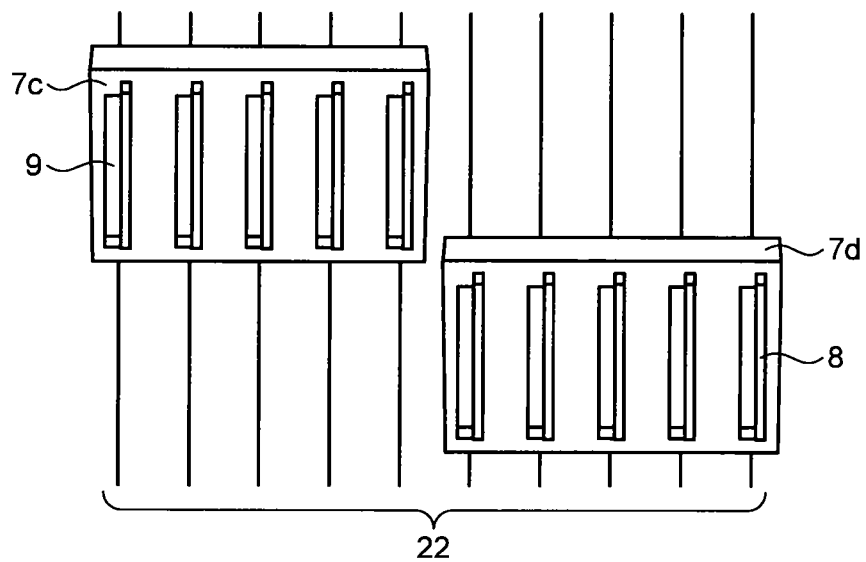

FIG. 9-1 is a perspective view illustrating a configuration of a power feeding unit of the eighth embodiment of the wire electric discharge machining apparatus according to the present invention. In this embodiment, the slidable contact conductors 9 and the power feeding terminals 8 electrically connected to a not-shown machining power source are held by a pair of power feeding jigs 7c and 7d. The power feeding jig 7c and 7d have a structure that hold two or more slidable contact conductors 9 and power feeding terminals 8. Other configurations are the same as those of any of the first to seventh embodiments.

Consequently, power can be fed to each cutting wire by adjusting each fixing position of the power feeding jigs 7c and 7d.

Moreover, the fixing positions of the power feeding jigs may be fixed to align in the direction orthogonal to the wire extending direction as illustrated in FIG. 9-1 or the power feeding jigs may be fixed in an offset manner in the wire extending direction as illustrated in FIG. 9-2.

Moreover, in the present embodiment, an example is illustrated where a voltage is applied to the cutting wire portions 21 by two power feeding jigs; however, it is not limited to this case and the number of the power feeding jigs and the arrangement position of the power feeding jigs are not specifically limited as long as the power feeding jig includes the pressing jig 31 and the fixing jig 32.

Ninth Embodiment

Figure 10:
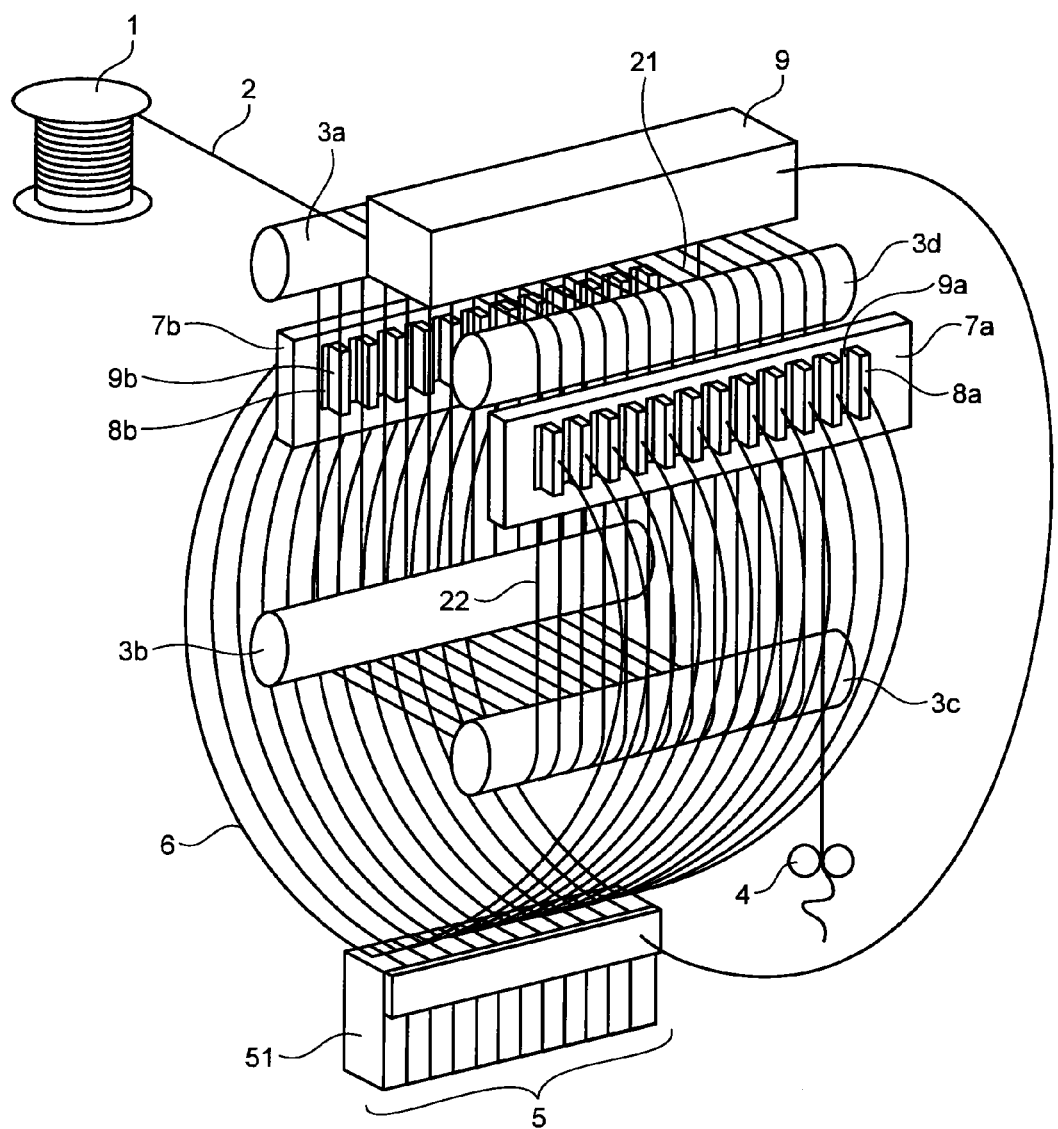
FIG. 10 is a perspective view illustrating a schematic configuration of a ninth embodiment of the wire electric discharge machining apparatus according to the present invention.

FIG. 10 is a perspective view illustrating a schematic configuration of the ninth embodiment of the wire electric discharge machining apparatus according to the present invention. In FIG. 10, this wire electric discharge machining apparatus includes the guide rollers 3a to 3d that arrange the wire electrodes 2 in parallel by winding the wire electrode 2 therearound, the machining power supply unit 5 that supplies a voltage to be applied between the wire electrode 2 and the workpiece 10, and power feeding jigs 7a and 7b that feed the voltage supplied from the machining power supply unit 5 to the wire electrode 2.

The power feeding jigs 7a and 7b include power feeding terminals 8a and 8b that receive the voltage supplied from the machining power supply unit 5 for each power feeding wire portion 22 and slidable contact conductors 9a and 9b that come into slidable contact with both ends of the cutting wire portions 21, respectively. Then, the power feeding terminals 8a and 8b and the slidable contact conductors 9a and 9b are held individually by the power feeding jigs 7a and 7b for each cutting wire portion 21 such that the power feeding terminals 8a and 8b are in contact with the slidable contact conductors 9a and 9b, respectively. Other configurations are the same as those in the first embodiment.

Consequently, when power is fed at both ends of the workpiece, a cumulative error can be prevented from occurring at each position of the slidable contact conductors 9a and 9b by the power feeding jigs 7a and 7b; therefore, each of the slidable contact conductors 9a and 9b can be positioned. Therefore, power feeding to the cutting power feeding wire portions 22 provided at both ends of the workpiece can be maintained satisfactorily by adjusting each fixing position of the power feeding jigs 7a and 7b. Moreover, even if the interval between the guide rollers 3a and 3d is wide, the potential between both ends of the cutting wire portions 21 can be made equal, whereby a power feeding state can be maintained satisfactorily.

Furthermore, the invention of the present application is not limited to the above embodiments and can be variously modified at the execution stage without departing from the scope thereof. Moreover, the above-described embodiments include inventions in various stages and various inventions can also be extracted by appropriately combining a plurality of disclosed components.

For example, even if several components are omitted from all the components shown in each of the above first to ninth embodiments, a configuration in which the several components are omitted can be extracted as an invention as long as the problem described in the column of Technical Problem can be solved and the effects described in the column of Advantageous Effects of Invention can be obtained. Furthermore, the components in the above-described first to ninth embodiments may be appropriately combined.

INDUSTRIAL APPLICABILITY

As above, a wire electric discharge machining apparatus according to the present invention enables positioning of each slidable contact conductor while preventing a cumulative error from occurring at the position of each slidable contact conductor even when there is a dimension error in the slidable contact conductor, and is therefore suitable for a method of collectively cutting out a plurality of thin plates from a workpiece by arranging wires in parallel by winding one wire between a plurality of guide rollers and generating a discharge between wire electrodes arranged in parallel and the workpiece.

REFERENCE SIGNS LIST 1 wire bobbin
2 wire electrode 21 cutting wire portion
22 power feeding wire portion
3a to 3d guide roller
4 wire collecting roller
5 machining power supply unit
51 machining power source
6 feeder wire
8, 8a, 8b, 61, 61' power feeding terminal
7, 7a, 7b, 7c, 7d power feeding jig
31, 71, 71a to 71d pressing jig
32, 72, 72a, 72a', 72b fixing jig
73 reference surface
74 pressing direction
75 pressing surface
77 bar-like member
9, 9a, 9b, 62, 62' slidable contact conductor
10 workpiece
Z1, Z2, Z11, Z12, Z22, Z32 opening
M1 groove

The invention claimed is:

1. A wire electric discharge machining apparatus comprising:
   a wire electrode;
   a guide roller that arranges wire electrodes in parallel by winding the wire electrode therearound;
   a plurality of slidable contact conductors that are in slidable contact with the wire electrodes arranged in parallel, respectively; and
   a power feeding jig that holds the slidable contact conductors individually and feeds power individually to the wire electrodes arranged in parallel via each of the slidable contact conductors, wherein
   the power feeding jig includes a plurality of reference surfaces that determine a fixing interval between the slidable contact conductors, a fixing jig in which the plurality of reference surfaces that determine a fixing interval between the slidable contact conductors is integrated, and a pressing jig that presses the slidable contact conductors against the reference surfaces.

2. The wire electric discharge machining apparatus according to claim 1, wherein
   the fixing jig includes an opening into which each of the slidable contact conductors is individually inserted, and
   the pressing jig is an elastic member that presses the slidable contact conductors against the reference surfaces in a state of being inserted into the opening.

3. The wire electric discharge machining apparatus according to claim 1, wherein the fixing jig and the pressing jig are an insulator or a conductor, a surface of which is coated with an insulator.

4. The wire electric discharge machining apparatus according to claim 1, comprising a groove that is formed in a slidable contact surface of the slidable contact conductor, is wider than a diameter of the wire electrode, and is deeper than a radius of the wire electrode.

5. The wire electric discharge machining apparatus according to claim 1, comprising a hole which is formed in the slidable contact conductor and has an indexable shape.

6. A wire electric discharge machining apparatus comprising:
   a wire electrode;
   a guide roller that arranges wire electrodes in parallel by winding the wire electrode therearound;
   a plurality of slidable contact conductors that are in slidable contact with the wire electrodes arranged in parallel, respectively; and
   a power feeding jig that holds the slidable contact conductors individually and feeds power individually to the wire electrodes arranged in parallel via each of the slidable contact conductors,
   wherein the power feeding jig includes a plurality of reference surfaces that determine a fixing interval between the slidable contact conductors, a fixing jig in which the plurality of reference surfaces that determine a fixing interval between the slidable contact conductors is integrated, and a pressing jig that presses the slidable contact conductors against the reference surfaces,
   further comprising:
   a plurality of first openings, which are formed in the fixing jig and into which each of the slidable contact conductors is individually inserted; and
   a plurality of second openings, which are formed in the pressing jig and into which each of the slidable contact conductors is individually inserted.

7. The wire electric discharge machining apparatus according to claim 6, comprising:
   a first step that is formed on the fixing jig such that a part of the fixing jig is inserted into the second openings; and
   a second step that is formed on the pressing jig such that a part of the pressing jig is inserted into the first openings.

8. A wire electric discharge machining apparatus comprising:
   a wire electrode;
   a guide roller that arranges wire electrodes in parallel by winding the wire electrode therearound;
   a plurality of slidable contact conductors that are in slidable contact with the wire electrodes arranged in parallel, respectively; and
   a power feeding jig that holds the slidable contact conductors individually and feeds power individually to the wire electrodes arranged in parallel via each of the slidable contact conductors,
   wherein the power feeding jig includes a plurality of reference surfaces that determine a fixing interval between the slidable contact conductors, a fixing jig in which the plurality of reference surfaces that determine a fixing interval between the slidable contact conductors is integrated, and a pressing jig that presses the slidable contact conductors against the reference surfaces,
   wherein the fixing jig and the pressing jig are formed in a wedge shape for each of the reference surfaces.

* * * * *

UNITED STATES PATENT AND TRADEMARK OFFICE
CERTIFICATE OF CORRECTION

PATENT NO. : 9,089,916 B2  
APPLICATION NO. : 13/817092  
DATED : July 28, 2015  
INVENTOR(S) : Itokazu et al.

Page 1 of 1

It is certified that error appears in the above-identified patent and that said Letters Patent is hereby corrected as shown below:

On the title page,

Item [57], line 2, change "a guide roller that arranges" to --a plurality of guide rollers that arrange--.

In the specification,

Column 2, lines 21-22, change "a guide roller that arranges" to --a plurality of guide rollers that arrange--.

In the claims,

Column 11, line 25 claim 1, column 12, line 7 claim 6, column 12, line 38 claim 8, change "a guide roller that arranges" to --a plurality of guide rollers that arrange--.

Signed and Sealed this  
Twenty-fourth Day of May, 2016

Michelle K. Lee  
*Director of the United States Patent and Trademark Office*